(12) United States Patent
Pan et al.

(10) Patent No.: US 8,084,548 B2
(45) Date of Patent: Dec. 27, 2011

(54) HYDROGENATION OF DIENE-BASED POLYMERS

(75) Inventors: Qinmin Pan, Waterloo (CA); Garry Rempel, Waterloo (CA); Jialong Wu, Kitchener (CA)

(73) Assignee: LANXESS Inc., Sarnia, Ontario (CA)

( * ) Notice: Subject to any disclaimer, the term of this patent is extended or adjusted under 35 U.S.C. 154(b) by 0 days.

(21) Appl. No.: 12/336,062

(22) Filed: Dec. 16, 2008

(65) Prior Publication Data

US 2009/0270563 A1 Oct. 29, 2009

(30) Foreign Application Priority Data

Dec. 17, 2007 (EP) .................................... 07123388

(51) Int. Cl.
*C08F 8/14* (2006.01)
(52) U.S. Cl. .................. 525/338; 525/332.8; 525/332.9; 525/333.1; 525/339
(58) Field of Classification Search .................. 525/338, 525/339
See application file for complete search history.

(56) References Cited

U.S. PATENT DOCUMENTS

| | | | |
|---|---|---|---|
| 3,454,644 A | 7/1969 | Dewhirst | 260/570.9 |
| 5,057,581 A | 10/1991 | Rempel et al. | 525/338 |
| 5,164,457 A | 11/1992 | Kubo et al. | 525/338 |
| 5,399,632 A | 3/1995 | Costello et al. | 525/339 |
| 5,652,191 A | 7/1997 | Patterson | 502/162 |
| 5,705,571 A | 1/1998 | Tsiang et al. | 525/338 |
| 5,837,158 A | 11/1998 | Shepodd | 252/181.6 |
| 6,020,439 A | 2/2000 | Ko et al. | 525/338 |
| 6,063,307 A | 5/2000 | Shepodd et al. | 252/181.6 |
| 6,110,397 A | 8/2000 | Shepodd et al. | 252/181.6 |
| 6,410,657 B1 | 6/2002 | Ko et al. | 525/338 |
| 6,683,136 B2 | 1/2004 | Guo et al. | 525/329.3 |
| 6,881,797 B2 | 4/2005 | Lin et al. | 525/338 |
| 2006/0211826 A1 | 9/2006 | Rempel et al. | 525/329.1 |
| 2007/0155909 A1 | 7/2007 | Shih et al. | 525/329.1 |

FOREIGN PATENT DOCUMENTS

| | | |
|---|---|---|
| EP | 1 702 930 | 9/2006 |
| WO | 02/100905 | 12/2002 |
| WO | 02/100941 | 12/2002 |

OTHER PUBLICATIONS

Gilliom; Macromolecules, vol. 22, No. 2, 1989, pp. 662-665; "Catalytic Hydrogenation of Polymers in the Bulk" XP-002474996.
Gilliom and Honnell; Macromolecules, vol. 25, No. 22, 1992, pp. 6066-6068, "Observation of a Reaction Front in the Bulk Catalytic Hydrogenation of a Polyolefin".
Journal of Polymer Science, Part A, Polymer Chemistry, vol. 30, No. 3, 1992, pp. 471-484, Bhattacharjee et al; "Preparation of Hydrogenated Nitrile Rubber using Palladium Acetate Catalyst: Its Characterization and Kinetics".
Platinum Metals Review, vol. 22, No. 4, 1978, pp. 126-129, Robert H. Crabtree; "Iridium Compounds in Homogeneous Hydrogenation".
Accounts of Chemical Research, vol. 12, 1979, pp. 331-337; Robert Crabtree; "Iridium Compounds in Catalysis".
Chemicals Industries, vol. 104, (Catalysis of Organic Reactions), 2005, pp. 125-134; Hu, McManus and Rempel; Hydrogenation of Nitrile Butadiene Rubber Catalyzed by $[Ir(COD)py(PCy_3)]PF_6$.

*Primary Examiner* — Bernard Lipman
(74) *Attorney, Agent, or Firm* — Jennifer R. Seng

(57) ABSTRACT

The present invention relates to a process for the hydrogenation of the carbon-carbon double bonds in diene-based polymers in bulk form by treatment of said diene-based polymer with hydrogen in the presence of an iridium containing catalyst and in the absence of any organic solvent.

18 Claims, No Drawings

HYDROGENATION OF DIENE-BASED POLYMERS

FIELD OF THE INVENTION

The present invention relates to a process for the selective hydrogenation of the carbon-carbon double bonds in diene-based polymers which are present in bulk form in the absence of organic solvents by using iridium containing catalysts.

BACKGROUND OF THE INVENTION

It is known that carbon-carbon double bonds in polymers may be successfully hydrogenated by treating the polymer in an organic solution with hydrogen in the presence of a catalyst, as disclosed in U.S. Pat. Nos. 6,881,797, 6,683,136, 6,410,657, 6,020,439, 5,705,571, 5,057,581, 5,652,191, 5,399,632, Journal of Polymer Science Part A: Polymer Chemistry Vol 30, no. 3, 1992, 471-484, U.S. Pat. Nos. 5,164,457 and 3,454,644. Such processes can be selective in the double bonds which are hydrogenated so that, for example, the double bonds in aromatic or naphthenic groups are not hydrogenated and double or triple bonds between carbon and other atoms such as nitrogen or oxygen are not affected. This field of art contains many examples of catalysts suitable for such hydrogenations, including catalysts based on cobalt, nickel, rhodium, ruthenium, osmium, and palladium. The suitability of the catalyst depends on the extent of hydrogenation required, the rate of the hydrogenation reaction and the presence or absence of other groups, such as carboxyl and nitrile groups, in the polymers. As a characteristic, such hydrogenation processes always require the use of a large amount of organic solvent to dissolve the polymers to be hydrogenated and work at a relatively high temperature (larger than 100° C.), which raises concerns with respect to the production cost and environmental protection. In this field of art it is furtheron desired to provide very efficient catalysts as this allows to minimize the required catalyst amount, which can milden the environmental concerns and reduce production cost.

US-2006/0211826 A1 discloses a process for the selective hydrogenation of olefinic unsaturation in polymers and copolymers in bulk form without the addition of any organic solvent, in the presence of hydrogen and a rhodium based catalyst. However, such process generally needs to be performed at relatively high temperatures of well above 100° C.

U.S. Pat. Nos. 6,110,397, 6,063,307 and 5,837,158 disclose a process for removing hydrogen from the atmosphere within enclosed spaces by using a hydrogen getter. The hydrogen getter comprises organic polymer molecules having carbon-carbon double bounds, and a hydrogenation catalyst consisting of a noble metal catalyst such as palladium or platinum. Such hydrogenation catalyst is mandatorily supported on an inert catalyst support material. The C=C double bonds are hydrogenated during the removal of hydrogen. The processes of U.S. Pat. Nos. 6,110,397, 6,063,307 and 5,837,158 do not have the aim to provide maximum hydrogenation degrees but a viable way to remove undesired hydrogen traces from the environment.

As efficient catalysts, iridium based catalysts, have been described in Platinum Metals Review, Vol 22, no. 4, 1978, 126-129 and Accounts of Chemical Research, Vol 12, 1979, 331-337) and received attention due to their high activity in hydrogenations even with low-molecular weight olefins even if those are highly substituted.

US-2007/0155909 A1 discloses a metal catalyst for hydrogenating unsaturated carbon-carbon bonds of copolymers wherein the said copolymers are dissolved in a solvent which is typically organic. The metal catalyst is a bimetallic complex comprising iridium and ruthenium.

In "Chemical Industries", Vol. 104 (Catalysis of Organic Reactions), 125-134, 2005, investigations about the use of Crabtree's catalyst for the hydrogenation of nitrile butadiene rubber in an organic solution are described. The catalyst was efficient for selective hydrogenation of olefinic groups in nitrile butadiene rubber at 120-140° C. and a hydrogen pressure of few hundred psi.

To eliminate the requirement for a large amount of organic solvents in hydrogenation operation, Laura R. Gilliom (Macromolecules Vol 22, no. 2, 1989, 662-665) and Laura R. Gilliom and Kevin G. Honnell (Macromolecules Vol. 25, no. 22, 1992, 6066-6068) had attempted to realize bulk hydrogenation of polymers using iridium based catalysts [Ir(COD)(py)(tcyp)]$PF_6$ and [Ir(COD)(PMePh$_2$)$_2$]$PF_6$ (COD=1,5-cyclooctadiene, Py=pyridine, tcyp=tricyclohexylphosphine). In Macromolecules Vol 22, no. 2, 1989, 662-665 [Ir(COD)(PMePh$_2$)$_2$]$PF_6$ is used for hydrogenating thermoplastic polymers and compared with Wilkinson's catalyst, i.e. Rh(PPh$_3$)$_3$Cl. The samples for the hydrogenation studies were cast from solution. The polymer was first dissolved in toluene or dichloromethane, the catalyst added and the solvent then removed. Hydrogenation rates of 80% have been achieved, however, the reaction rate was very low and the reaction needed five or even more than five days to reach a relatively high conversion. Additionally it was recognized that only high catalyst loadings result in a sufficient hydrogen uptake in the first five reaction hours. Examples with different catalyst loadings show that a loading with 1 weight % catalyst does not result in any recognizable hydrogen uptake. Using a catalyst loading of 3.2 weight % improves the hydrogen uptake, but only with 9.1 weight % is an acceptable hydrogen uptake recognized. In Macromolecules Vol. 25, no. 22, 1992, 6066-6068 [Ir(COD)(py)(tcyp)]$PF_6$ is used as catalyst.

In summary, the research in this area, namely, the hydrogenation of diene-based polymers, has been very successful if the polymers were dissolved in an organic solvent or if the hydrogenation is carried out at a relatively high reaction temperature. The research activities clearly focused on efficient hydrogenation of diene-based polymers in bulk form, however, are so far very limited: In Macromolecules Vol 22, no. 2, 1989, 662-665 and Macromolecules Vol 25, no. 22, 1992, 6066-6068 rhodium and iridium based catalysts were applied, however, the reaction rate was very low and the amount of iridium based catalyst to be used was very high.

The present invention therefore has the object to provide a new and improved process allowing the selective hydrogenation of a diene-based polymer in bulk form with a high degree of hydrogenation within acceptable short reaction time and at mild reaction temperatures.

SUMMARY OF THE INVENTION

The present invention provides a process for selectively hydrogenating carbon-carbon double bonds in a diene-based polymer comprising subjecting a diene-based polymer which is present in bulk form to hydrogenation in the absence of any organic solvent and in the presence of less than 1% by weight of an iridium containing catalyst, based on the diene-based polymer to be hydrogenated.

DETAILED DESCRIPTION OF THE INVENTION

The process of the present invention allows a selective hydrogenation of the carbon-carbon double bonds which are present in the diene based polymers. This means that, for example, the double bonds in aromatic or naphthenic groups are not hydrogenated and double or triple bonds between carbon and other atoms such as nitrogen or oxygen are also not affected.

The combination of using a low amount of an iridium containing catalyst in the absence of any organic solvent to hydrogenate an ethylenically unsaturated polymer being present in bulk form is novel and important for the successful performance of the hydrogenation process pursuant to the present invention.

Using the said novel process a high degree of hydrogenation is achieved, the rate of hydrogenation is high and the crosslinking problem occurring in the processes known from prior art is overcome.

Compared to Gilliom's reports (Macromolecules Vol 22, no. 2, 1989, 662-665, Macromolecules Vol. 25, no. 22, 1992, 6066-6068), the present invention renders much faster hydrogenation with applying lower amount of catalyst and extends to the hydrogenation of polymers which are more difficult to be saturated, such as nitrile butadiene rubber, than Macromolecules Vol 22, no. 2, 1989, 662-665 and Macromolecules Vol. 25, no. 22, 1992, 6066-6068 had investigated.

The hydrogenation process of the present invention is performed using an iridium containing hydrogenation catalyst. Preferably the process of the present invention is performed using an iridium complex as catalyst, more preferably an iridium complex which has the general formula (I)

[Ir(COD)LL']PF$_6$ (I)

wherein

| | |
|---|---|
| COD | means 1,5-cyclooctadiene, |
| L | means PR$_3$ with R being alkyl, cycloalkyl, or aryl, and |
| L' | means PR$_3$ or pyridine with R being alkyl, cycloalkyl, or aryl. |

The aforementioned substituents alkyl, cycloalkyl, or aryl are optionally further substituted by one or more substituents, like e.g. alkyl, cycloalkyl or aryl residues.

Even more preferably an iridium complex of general formula (I) is used in which R means $C_1$-$C_{10}$ alkyl, $C_3$-$C_8$ cycloalkyl, $C_6$-$C_{24}$ aryl.

For example, L and L' may represent PMePh$_3$ (Me=methyl, Ph=phenyl), PPh$_3$, PCy$_3$ (Cy=cyclohexyl), P(i-Pr)$_3$ (i-Pr=isopropyl), dpe (diphenylethyl) and pyridine (in case of L').

The iridium containing catalyst is present at less than 1% by weight, based on the polymer to be hydrogenated. Preferably the iridium containing catalyst is present with 0.001% b.w.-0.98% b.w., more preferably with 0.01% b.w.-0.80% b.w. based on the diene-based polymer to be hydrogenated.

Polymers having carbon-carbon double bonds which may be subjected to the inventive process comprise repeating units based on at least one conjugated diene monomer.

The conjugated diene can be of any nature. In one embodiment ($C_4$-$C_6$) conjugated dienes are used. Preference is given to 1,3-butadiene, isoprene, 1-methylbutadiene, 2,3-dimethylbutadiene, piperylene, chloroprene, or mixtures thereof. Particular preference is given to 1,3-butadiene and isoprene or mixtures thereof. Special preference is given to 1,3-butadiene.

In a further embodiment polymers having carbon-carbon double bonds may be subjected to the inventive process which comprise repeating units of at least one conjugated diene as monomer (a) and at least one further copolymerizable monomer (b).

Examples of suitable monomers (b) are olefins, such as ethylene or propylene.

Further examples of suitable monomers (b) are vinylaromatic monomers, such as styrene, alpha-methyl styrene, o-chlorostyrene or vinyltoluenes, vinylesters of aliphatic or branched $C_1$-$C_{18}$ monocarboxylic acids, such as vinyl acetate, vinyl propionate, vinyl butyrate, vinyl valerate, vinyl hexanoate, vinyl 2-ethylhexanoate, vinyl decanoate, vinyl laurate and vinyl stearate.

A preferred polymer to be used in the present invention is a copolymer of 1,3-butadiene and styrene or alpha-methylstyrene. Said copolymers may have a random or block type structure.

Further examples of suitable monomers (b) are esters of ethylenically unsaturated mono- or dicarboxylic acids such as acrylic acid, methacrylic acid, maleic acid, fumaric acid and itaconic acid with generally $C_1$-$C_{12}$ alkanols, such as methanol, ethanol, n-propanol, isopropanol, 1-butanol, 2-butanol, isobutanol, tert.-butanol, n-hexanol, 2-ethylhexanol, or $C_5$-$C_{10}$ cycloalkanols, such as cyclopentanol or cyclohexanol, and of these preferably the esters of acrylic and/or methacrylic acid, examples being methyl methacrylate, n-butyl methacrylate, tert-butyl methacrylate, n-butyl acrylate, tert-butyl acrylate, and 2-ethylhexyl acrylate.

Suitable further copolymerizable monomers (b) are α,β-unsaturated nitriles. It is possible to use any known α,β-unsaturated nitrile, preferably a ($C_3$-$C_5$) α,β-unsaturated nitrile such as acrylonitrile, methacrylonitrile, ethacrylonitrile or mixtures thereof. Particular preference is given to acrylonitrile.

A particularly suitable copolymer to be used in the present invention is a nitrile rubber (also abbreviated as "NBR") this being a copolymer of an α,β-unsaturated nitrile, particularly preferred acrylonitrile, and a conjugated diene, particularly preferred 1,3-butadiene and optionally one or more further copolymerizable monomers, such as α,β-unsaturated monocarboxylic or dicarboxylic acids, their esters or amides.

As α,β-unsaturated monocarboxylic or dicarboxylic acids in such nitrile rubbers preference is given to fumaric acid, maleic acid, acrylic acid and methacrylic acid.

As esters of α,β-unsaturated carboxylic acids in such nitrile rubbers preference is given to using their alkyl esters and alkoxyalkyl esters. Particularly preferred alkyl esters of α,β-unsaturated carboxylic acids are methyl acrylate, ethyl acrylate, propyl acrylate, n-butyl acrylate, tert-butyl acrylate, propyl methacrylate, n-butyl methacrylate, tert-butyl methacrylate, 2-ethylhexyl acrylate, 2-ethylhexyl methacrylate and octyl acrylate. Particularly preferred alkoxyalkyl esters of α,β-unsaturated carboxylic acids are methoxyethyl(meth)acrylate, ethoxyethyl(meth)acrylate and methoxyethyl(meth)acrylate. It is also possible to use mixtures of alkyl esters, e.g. those mentioned above, with alkoxyalkyl esters, e.g. in the form of those mentioned above.

A preferred terpolymer to be used in the present invention is a terpolymer of acrylonitrile, 1,3-butadiene and a third monomer selected from the group consisting of fumaric acid, maleic acid, acrylic acid, methacrylic acid, n-butyl acrylate, and tert-butyl acrylate.

In case that the polymer to be subjected to hydrogenation comprises not only repeating units of one or more conjugated dienes, but also repeating units of one or more further copolymerizable monomers, the proportions of conjugated diene(s) and the other copolymerizable monomers may vary within wide ranges:

In case of NBR polymers being used for hydrogenation the proportion of or of the sum of the conjugated dienes is usually in the range from 40 to 90% by weight, preferably in the range from 50 to 85% by weight, based on the total polymer. The proportion of or of the sum of the α,β-unsaturated nitriles is usually from 10 to 60% by weight, preferably from 15 to 50% by weight, based on the total polymer. The proportions of the monomers in each case add up to 100% by weight. Additional termonomers may optionally be present. If used, they are typically present in amounts of from greater than 0 to 40% by weight, preferably from 0.1 to 40% by weight, particularly preferably from 1 to 30% by weight, based on the total polymer. In this case, corresponding proportions of the conjugated diene(s) and/or of the α,β-unsaturated nitrile(s) are replaced by the proportions of the additional termonomers, with the proportions of all monomers in each case adding up to 100% by weight.

The preparation of nitrile rubbers by polymerization of the abovementioned monomers is adequately known to those skilled in the art and is comprehensively described in the polymer literature.

Nitrile rubbers which can be used for the purposes of the invention are also commercially available, e.g. as products from the product range of the trade names Perbunan® and Krynac® from Lanxess Deutschland GmbH.

In another embodiment of the invention it is possible to use nitrile rubbers which have been subjected to a metathesis reaction in order to decrease their molecular weight. Such metathesis reaction is known in the art and e.g. disclosed in WO-A-02/100905 and WO-A-02/100941.

The nitrile rubbers which may be used pursuant to this invention have a Mooney viscosity (ML 1+4 at 100° C.) in the range from 3 to 75, preferably in the range of from 5 to 75, more preferably in the range of from 20 to 75, even more preferably in the range of from 25 to 75 and particularly in the range of from 30 to 50. The weight average molecular weight $M_w$ for such nitrile rubbers lies typically in the range 25.000-500.000, preferably in the range of from 200.000-500.000, more preferably in the range 20.000-40.000. A nitrile rubber having a Mooney viscosity of e.g. about 34 has an intrinsic viscosity, determined in chlorobenzene at 35° C., of about 1.1 dL/g. The nitrile rubbers used also have a polydispersity $PDI=M_w/M_n$, where $M_w$ is the weight average molecular weight and $M_n$ is the number average molecular weight, in the range 1.5-6.0, preferably 1.8-6.0 and more preferably in the range 2.0-4.0. The determination of the Mooney viscosity is carried out in accordance with ASTM standard D 1646.

If a polymer other than a nitrile rubber is used in the present invention which contains repeating units of one or more conjugated dienes and one or more other copolymerizable monomers like e.g. styrene or alpha-methylstyrene the proportion of the conjugated diene(s) is usually from 15 to less than 100% b.w. and the proportion of or of the sum of the copolymerizable monomer(s) is from greater than 0 to 85% b.w. with the proportion of all monomers in each case adding up to 100%. If styrene or alphamethyl styrene are used as other copolymerizable monomers, the proportion of styrene and/or a methyl styrene is preferably from 15 to 60% b.w., while the remainder to 100% b.w. is represented by the conjugated diene(s).

The carbon-carbon double bond containing polymer in bulk form to be used in the present invention may be prepared by any method known to those skilled in the art, such as emulsion polymerization, solution polymerization or bulk polymerization.

The hydrogenation of the diene-based polymer is undertaken in bulk form. The use of organic solvents which is conventional in hydrogenation reactions according to the prior art is eliminated; this means no organic solvent is present during the performance of the process pursuant to the present invention. The diene-based polymers to be hydrogenated according to the present invention can be in the form of any particles or thin films. There is no restricting requirement for the particle size and shape or the thickness of the films. However, the smaller the particle size or the thinner the film, the quicker the hydrogenation is; and generally the particle size or the thickness of the films is less than 10 mm, preferably less than 3 mm.

The catalyst can be introduced into the diene-based polymer by any possible means, such as e.g. impregnation or mechanical mixing. Preferred is any procedure which can result in molecular mixing of the catalyst and polymer.

According to a first embodiment it is for example possible to mix the catalyst solids physically with polymer particles by any mixing means, for example, the polymer particles and catalyst solids can even be simply mixed by stirring the catalyst solids and polymer particles together using a spoon or stick.

In another embodiment it is possible to contact the catalyst with the diene-based polymer to be hydrogenated by e.g. adding the catalyst or a catalyst solution to a polymer solution and mixing until an efficient distribution and dissolution of the catalyst has taken place. After the dissolution of the catalyst, the solvent is removed and either a polymer film or particles are obtained which are then subjected to the inventive hydrogenation. Typically the temperature is controlled to be in a range of from 0 to 30° C., preferably in the range of from 0 to 10° C., during such mixing and solvent removal operations. It is preferred not to keep the sample prepared in this way for a too long time, depending on the reaction temperature at which the sample will be hydrogenated. Typically the time of sample storage prior to hydrogenation should not be too long, preferably not much longer than 70 hours at atmospheric conditions, when the subsequent hydrogenation temperature is between 37-50° C., and should not be much longer than 20 hours at atmospheric conditions, when the hydrogenation temperature is lower than 37° C. However, if the samples are protected at a lower temperature and/or prevented from contacting oxygen, storage time of the samples can be much longer before the hydrogenation is carried out. Due to this sample preparation a direct contact between the hydrogenation catalyst and hydrogen does not take place before the polymer hydrogenation process.

In the third embodiment the iridium containing catalyst is contacted with the diene-based polymer to be hydrogenated by impregnating the polymer particles or film with the catalyst. The catalyst is applied to the polymer particles or film by using a medium, such as an organic solvent or $CO_2$. Such a medium should not dissolve the polymer and also should be chemically inert to the polymer/catalyst system. The temperature for the impregnation is recommended to be lower than 50° C. The time for the impregnation operation could be a few minutes to 10 hours, depending on the particle size or the film thickness and the impregnation temperature as well as the medium used. After the impregnation step, the medium is released/removed and either a catalyst-impregnated polymer film or particles are obtained which are then subjected to hydrogenation. Again it is recommended not to keep the sample prepared in this way for a too long time, depending on the reaction temperature at which the sample will be hydrogenated. In general this time should not be much longer than 70 hours, when the hydrogenation temperature is between 37-50° C., and should not be much longer than 20 hours, when the hydrogenation temperature is lower than 37° C. Due to this sample preparation a direct contact between the hydrogenation catalyst and hydrogen does not take place before the polymer hydrogenation process.

The hydrogenation process of the present invention can be undertaken in a suitable reactor equipped with temperature regulating and agitating means. According to the present invention, the material to be subjected to the hydrogenation, i.e. the combination of the carbon carbon double bond containing polymer and the iridium-containing catalyst can be used in particles or films the size of which may be adapted as desired by any possible way, such as using normal cutting tools (scissors or knifes, etc.) or any particle generating process.

The hydrogenation process of the present invention is generally carried out at a temperature in the range of from 30° C. to 200° C., preferably in the range of from 50° C. to 170° C.

During the course of the hydrogenation reaction the hydrogen is added to the reactor. The hydrogenation process of the present invention is typically carried out with hydrogen gas at a pressure of from 0.1 to 20 MPa, preferably at a pressure of from 0.5 to 16 MPa. The hydrogen gas is preferably essentially pure.

The reaction time is typically from about one quarter of an hour to about 100 hours, depending on operational conditions. However, the present invention stands out for the possibility to achieve excellent hydrogenation degrees at rather short reaction times if the conditions are chosen respectively.

When the hydrogenation reaction is complete, to the extent desired, the reaction vessel can be cooled and vented and the hydrogenated polymer is obtained.

The hydrogenated nitrile rubbers obtained pursuant to this invention have a Mooney viscosity (ML 1+4 at 100° C.) in the range of from 6 to 150, preferably in the range of from 25 to 100, more preferably in the range of from 35 to 100, and even more preferred in the range of from 39 to 100 and particularly preferred in the range of from 40 to 100.

The invention is further illustrated but is not intended to be limited by the following examples in which all parts and percentages are by weight unless otherwise specified.

EXAMPLES

The materials which were used in the Examples are listed in Table 1.

TABLE 1

| Specification of the Materials | |
|---|---|
| Material | Supplier |
| Butadiene-acrylonitrile rubber (Krynac ® 3850) containing 62% butadiene and 38% acrylonitrile, Mooney-Viscosity (ML 1 + 4 at 100° C.) of about 50 | Lanxess Inc. |
| SBS (styrene/butadiene, ABA block copolymer) containing 28% styrene | Aldrich Chemical Company, Inc. |
| Crabtree's catalyst: [(tricyclohexylphosphine) (1,5-cyclooctadiene)(pyridine) iridium (I) hexafluorophosphate] (99%) | Strem Chemicals |
| Hydrogen (99.999%) | Praxair |
| Dichloromethane (99.6%) | Sigma-Aldrich |
| Methyl ethyl ketone (99.8%) | Fisher Scientific |
| Benzene (>99%) | EM Science |

Preparation of Sample A:

15 g of the above mentioned butadiene-acrylonitrile copolymer solution (4% by weight in dichloromethane) was degassed with nitrogen gas. 0.0030 g of Crabtree's catalyst [(tricyclohexylphosphine)(1,5-cyclooctadiene)(pyridine) iridium(I) hexafluorophosphate] was put into a flask with an arm which can be connected to a vacuum system. The flask was immersed in an ice-water bath. After the flask was degassed with nitrogen gas, the polymer solution was transferred into it by using a needle. After the dissolution of Crabtree's catalyst, the solution was dried under vacuum for about 2 hours. After the drying operation, the polymer sample became film-like, and the thickness was about 0.1~2 mm. The polymer sample was denoted as Sample A and was used for the hydrogenation in Examples 1-6 under the conditions listed in Table 2.

Preparation of Sample B:

The same conditions and procedures as described in Preparation of Sample A were employed, except 0.0015 g of Crabtree's catalyst was applied. The obtained polymer sample was denoted as Sample B and was used for hydrogenation in Examples 7-21 under the conditions listed in Table 2.

Preparation of Sample C:

The same conditions and procedures as described in Preparation of Sample A were employed, except 0.00075 g Crabtree's catalyst was applied as a catalyst. The obtained polymer sample was denoted as Sample C and was used for hydrogenation in Examples 22-45 under the conditions listed in Table 2.

Preparation of Sample D:

The same conditions and procedures as described in Preparation of Sample A were employed, except 0.00036 g of Crabtree's catalyst was applied. The obtained sample was denoted as Sample D and was used for hydrogenation in Examples 46-54 under the conditions listed in Table 2.

Preparation of Sample E:

The same conditions and procedures as described in Preparation of Sample C were employed, except 15 g of SBS (see Table 1) copolymer solution (4% by weight in dichloromethane) was applied. The said polymer had a bound styrene content of 28%. The obtained sample was denoted as Sample E and was used for hydrogenation in Examples 55-60 under the conditions listed in Table 2.

Hydrogenation Examples using Sample A

Example 1

A 300 ml glass-lined stainless steel autoclave, equipped with temperature control means, an agitator, a pressure gauge and a hydrogen gas addition port, was used as a reactor. Sample A (prepared as in Preparation of Sample A) was put into the reactor and the reactor was degassed with hydrogen gas. At 80° C., 1200 psi (8.28 MPa) of hydrogen pressure was applied for 1.0 hour. Afterwards the reactor was cooled down and the pressure was released, and the polymer product was taken out of the reactor. The polymer product was dissolved in methyl ethyl ketone and the degree of hydrogenation was determined by infra-red analysis. A 74.3% degree of hydrogenation was achieved.

Example 2

The same procedures and conditions as described in Example 1 were employed, except 3.0 hours of reaction time was applied. The resultant polymer was dissolved in methyl ethyl ketone and a 97.3% degree of hydrogenation was achieved.

Example 3

The same procedures and conditions as described in Example 1 were employed, except 6.0 hours of reaction time was applied. The resultant polymer was dissolved in methyl ethyl ketone and a 99.4% degree of hydrogenation was achieved.

Example 4

The same procedures and conditions as described in Example 1 were employed, except 90° C. of reaction temperature was applied. The resultant polymer was dissolved in methyl ethyl ketone and an 87.1% degree of hydrogenation was achieved.

Example 5

The same procedures and conditions as described in Example 4 were employed, except 3.0 hours of reaction time was applied. The resultant polymer was dissolved in methyl ethyl ketone and a 99.3% degree of hydrogenation was achieved.

Example 6

The same procedures and conditions as described in Example 4 were employed, except 6.0 hours of reaction time was applied. The resultant polymer was dissolved in methyl ethyl ketone and a 99.9% degree of hydrogenation was achieved.

Hydrogenation Examples Using Sample B

Example 7

The same procedures and conditions as described in Example 1 were employed, except polymer sample B (prepared as in Preparation of Sample B) was used and 400 psi (2.76 MPa) of hydrogen pressure and 100° C. of reaction temperature were applied. The resultant polymer was dissolved in methyl ethyl ketone and a 23.4% degree of hydrogenation was achieved.

Example 8

The same procedures and conditions as described in Example 7 were employed, except 3.0 hours of reaction time was applied. The resultant polymer was dissolved in methyl ethyl ketone and a 53.0% degree of hydrogenation was achieved.

Example 9

The same procedures and conditions as described in Example 7 were employed, except 6.0 hours of reaction time was applied. The resultant polymer was dissolved in methyl ethyl ketone and a 80.0% degree of hydrogenation was achieved.

Example 10

The same procedures and conditions as described in Example 7 were employed, except 800 (5.52 MPa) psi of hydrogen pressure was applied. The resultant polymer was dissolved in methyl ethyl ketone and a 60.2% degree of hydrogenation was achieved.

Example 11

The same procedures and conditions as described in Example 8 were employed, except 800 psi (5.52 MPa) of hydrogen pressure was applied. The resultant polymer was dissolved in methyl ethyl ketone and a 90.0% degree of hydrogenation was achieved.

Example 12

The same procedures and conditions as described in Example 9 were employed, except 800 psi (5.52 MPa) of hydrogen pressure was applied. The resultant polymer was dissolved in methyl ethyl ketone and a 99.2% degree of hydrogenation was achieved.

Example 13

The same procedures and conditions as described in Example 10 were employed, except 1200 psi (8.28 MPa) of hydrogen pressure was applied. The resultant polymer was dissolved in methyl ethyl ketone and a 77.4% degree of hydrogenation was achieved.

Example 14

The same procedures and conditions as described in Example 11 were employed, except 1200 psi (8.28 MPa) of hydrogen pressure was applied. The resultant polymer was dissolved in methyl ethyl ketone and a 99.0% degree of hydrogenation was achieved.

Example 15

The same procedures and conditions as described in Example 12 were employed, except 1200 psi (8.28 MPa) of hydrogen pressure was applied. The resultant polymer was dissolved in methyl ethyl ketone and a 99.8% degree of hydrogenation was achieved.

Example 16

The same procedures and conditions as described in Example 13 were employed, except 80° C. of reaction temperature was applied. The resultant polymer was dissolved in methyl ethyl ketone and a 31.3% degree of hydrogenation was achieved.

Example 17

The same procedures and conditions as described in Example 14 were employed, except 80° C. of reaction temperature was applied. The resultant polymer was dissolved in methyl ethyl ketone and a 60.9% degree of hydrogenation was achieved.

Example 18

The same procedures and conditions as described in Example 15 were employed, except 80° C. of reaction temperature was applied. The resultant polymer was dissolved in methyl ethyl ketone and an 86.6% degree of hydrogenation was achieved.

Example 19

The same procedures and conditions as described in Example 16 were employed, except 90° C. of reaction temperature was applied. The resultant polymer was dissolved in methyl ethyl ketone and a 47.0% degree of hydrogenation was achieved.

Example 20

The same procedures and conditions as described in Example 17 were employed, except 90° C. of reaction temperature was applied. The resultant polymer was dissolved in methyl ethyl ketone and a 75.0% degree of hydrogenation was achieved.

Example 21

The same procedures and conditions as described in Example 18 were employed, except 90° C. of reaction temperature was applied. The resultant polymer was dissolved in methyl ethyl ketone and a 93.5% degree of hydrogenation was achieved.

Hydrogenation Examples Using Sample C

Example 22

The same procedures and conditions as described in Example 19 were employed, except polymer sample C (prepared as in Preparation of Sample C) was applied. The resultant polymer was dissolved in methyl ethyl ketone and a 23.1% degree of hydrogenation was achieved.

Example 23

The same procedures and conditions as described in Example 22 were employed, except 3.0 hours of reaction time was applied. The resultant polymer was dissolved in methyl ethyl ketone and a 56.7% degree of hydrogenation was achieved.

Example 24

The same procedures and conditions as described in Example 22 were employed, except 6.0 hours of reaction time was applied. The resultant polymer was dissolved in methyl ethyl ketone and an 81.5% degree of hydrogenation was achieved.

Example 25

The same procedures and conditions as described in Example 23 were employed, except 100° C. of reaction time and 400 psi of hydrogen pressure were applied. The resultant polymer was dissolved in methyl ethyl ketone and a 29.2 percent degree of hydrogenation was achieved.

Example 26

The same procedures and conditions as described in Example 25 were employed, except 6.0 hours of reaction time was applied. The resultant polymer was dissolved in methyl ethyl ketone and a 53.1% degree of hydrogenation was achieved.

Example 27

The same procedures and conditions as described in Example 22 were employed, except 100° C. of reaction temperature and 800 psi of hydrogen pressure were applied. The resultant polymer was dissolved in methyl ethyl ketone and a 34.1 percent degree of hydrogenation was achieved.

Example 28

The same procedures and conditions as described in Example 27 were employed, except 3.0 hours of reaction time was applied. The resultant polymer was dissolved in methyl ethyl ketone and a 64.8% degree of hydrogenation was achieved.

Example 29

The same procedures and conditions as described in Example 27 were employed, except 6.0 hours of reaction time was applied. The resultant polymer was dissolved in methyl ethyl ketone and an 87.7% degree of hydrogenation was achieved.

Example 30

The same procedures and conditions as described in Example 27 were employed, except that 1200 psi (8.28 MPa) of hydrogen pressure was applied. The resultant polymer was dissolved in methyl ethyl ketone and a 52.5% degree of hydrogenation was achieved.

Example 31

The same procedures and conditions as described in Example 30 were employed, except that 3.0 hours of reaction time was applied. The resultant polymer was dissolved in methyl ethyl ketone and an 85.2% degree of hydrogenation was achieved.

Example 32

The same procedures and conditions as described in Example 30 were employed, except that 6.0 hours of reaction time was applied. The resultant polymer was dissolved in methyl ethyl ketone and a 96.7% degree of hydrogenation was achieved.

Example 33

The same procedures and conditions as described in Example 30 were employed, except that 120° C. of reaction temperature was applied. The resultant polymer was dissolved in methyl ethyl ketone and a 66.3% degree of hydrogenation was achieved.

Example 34

The same procedures and conditions as described in Example 33 were employed, except that 3.0 hours of reaction time was applied. The resultant polymer was dissolved in methyl ethyl ketone and a 92.0% degree of hydrogenation was achieved.

Example 35

The same procedures and conditions as described in Example 33 were employed, except that 6.0 hours of reaction time was applied. The resultant polymer was dissolved in methyl ethyl ketone and a 98.2% degree of hydrogenation was achieved.

Example 36

The same procedures and conditions as described in Example 30 were employed, except that 130° C. of reaction temperature was applied. The resultant polymer was dissolved in methyl ethyl ketone and a 73.5% degree of hydrogenation was achieved.

Example 37

The same procedures and conditions as described in Example 36 were employed, except that 3.0 hours of reaction time was applied. The resultant polymer was dissolved in methyl ethyl ketone and a 95.5% degree of hydrogenation was achieved.

Example 38

The same procedures and conditions as described in Example 36 were employed, except that 140° C. of reaction temperature was applied. The resultant polymer was dissolved in methyl ethyl ketone and a 79.5% degree of hydrogenation was achieved.

Example 39

The same procedures and conditions as described in Example 38 were employed, except that 3.0 hours of reaction time was applied. The resultant polymer was dissolved in methyl ethyl ketone and a 95.8% degree of hydrogenation was achieved.

Example 40

The same procedures and conditions as described in Example 38 were employed, except that 150° C. of reaction temperature was applied. The resultant polymer was dissolved in methyl ethyl ketone and a 96.1% degree of hydrogenation was achieved.

Example 41

The same procedures and conditions as described in Example 40 were employed, except that 3.0 hours of reaction time was applied. The resultant polymer was dissolved in methyl ethyl ketone and a 98.4% degree of hydrogenation was achieved.

Example 42

The same procedures and conditions as described in Example 40 were employed, except that 160° C. of reaction temperature was applied. The resultant polymer was dissolved in methyl ethyl ketone and a 95.6% degree of hydrogenation was achieved.

Example 43

The same procedures and conditions as described in Example 42 were employed, except that 3.0 hours of reaction time was applied. The resultant polymer was dissolved in methyl ethyl ketone and a 98.4% degree of hydrogenation was achieved.

Example 44

The same procedures and conditions as described in Example 42 were employed, except that 170° C. of reaction temperature was applied. The resultant polymer was dissolved in methyl ethyl ketone and a 93.5% degree of hydrogenation was achieved.

Example 45

The same procedures and conditions as described in Example 44 were employed, except that 3.0 hours of reaction time was applied. The resultant polymer was dissolved in methyl ethyl ketone and a 98.9% degree of hydrogenation was achieved.

Hydrogenation Examples using Sample D

Example 46

The same procedures and conditions as described in Example 33 were employed, except that polymer sample D (prepared as in Preparation of Sample D) was applied. The resultant polymer was dissolved in methyl ethyl ketone and a 27.5% degree of hydrogenation was achieved.

Example 47

The same procedures and conditions as described in Example 46 were employed, except that 3.0 hours of reaction time was applied. The resultant polymer was dissolved in methyl ethyl ketone and a 39.4 percent degree of hydrogenation was achieved.

Example 48

The same procedures and conditions as described in Example 47 were employed, except that 6.0 hours of reaction time was applied. The resultant polymer was dissolved in methyl ethyl ketone and a 61.1% degree of hydrogenation was achieved.

Example 49

The same procedures and conditions as described in Example 46 were employed, except that 140° C. of reaction temperature was applied. The resultant polymer was dissolved in methyl ethyl ketone and a 33.3% degree of hydrogenation was achieved.

Example 50

The same procedures and conditions as described in Example 49 were employed, except that 3.0 hours of reaction time was applied. The resultant polymer was dissolved in methyl ethyl ketone and a 45.6% degree of hydrogenation was achieved.

Example 51

The same procedures and conditions as described in Example 50 were employed, except that 6.0 hours of reaction time was applied. The resultant polymer was dissolved in methyl ethyl ketone and a 63.5% degree of hydrogenation was achieved.

Example 52

The same procedures and conditions as described in Example 49 were employed, except that 160° C. of reaction temperature was applied. The resultant polymer was dissolved in methyl ethyl ketone and a 43.3% degree of hydrogenation was achieved.

Example 53

The same procedures and conditions as described in Example 52 were employed, except that 3.0 hours of reaction time was applied. The resultant polymer was dissolved in methyl ethyl ketone and a 58.6% degree of hydrogenation was achieved.

Example 54

The same procedures and conditions as described in Example 53 were employed, except that 6.0 hours of reaction time was applied. The resultant polymer was dissolved in methyl ethyl ketone and a 65.6% degree of hydrogenation was achieved.

Hydrogenation Examples Using Sample E

Example 55

The same procedures and conditions as described in Example 52 were employed, except that 400 psi (2.76 MPa) of hydrogen pressure and 80° C. of reaction temperature were applied and Sample E was employed. The resultant polymer was dissolved in benzene and a 92.8% degree of hydrogenation was achieved.

Example 56

The same procedures and conditions as described in Example 55 were employed, except that 3.0 hours of reaction time was applied. The resultant polymer was dissolved in benzene and a 96.4% degree of hydrogenation was achieved.

Example 57

The same procedures and conditions as described in Example 56 were employed, except that 6.0 hours of reaction time was applied. The resultant polymer was dissolved in benzene and a 98.5% degree of hydrogenation was achieved.

Example 58

The same procedures and conditions as described in Example 55 were employed, except that 100° C. of reaction temperature was applied. The resultant polymer was dissolved in benzene and a 98.0% degree of hydrogenation was achieved.

Example 59

The same procedures and conditions as described in Example 58 were employed, except that 3.0 hours of reaction time was applied. The resultant polymer was dissolved in benzene and a 99.4% degree of hydrogenation was achieved.

Example 60

The same procedures and conditions as described in Example 58 were employed, except that 60° C. of reaction temperature and 100 psi of hydrogen pressure were applied. The resultant polymer was dissolved in benzene and a 54.9% degree of hydrogenation was achieved.

Hydrogenation Examples by Physically Mixing Catalyst Solids and Polymer Particles

Example 61

0.6 g of the above mentioned butadiene-acrylonitrile copolymer was cut by using scissors into particles with an average diameter of about 1.5 mm. The said polymer particles was physically mixed with 0.0050 g of Crabtree's catalyst solids by stirring the polymer particles and catalyst solids together with a spoon.

A 300 ml glass-lined stainless steel autoclave, equipped with temperature control means, an agitator, a pressure gauge and a hydrogen gas addition port, was used as a reactor. The mixture of catalyst solids and polymer particles was put into the reactor and the reactor was degassed with hydrogen gas. At 145° C., 500 psi (3.45 MPa) of hydrogen pressure was applied for 3 hours. Afterwards the reactor was cooled down and the pressure was released, and the polymer product was taken out of the reactor. The polymer product was dissolved in methyl ethyl ketone, some insoluble gel was observed. The hydrogenation degree of the soluble part was determined by infra-red analysis. A 52.4% degree of hydrogenation of the soluble part was achieved.

Example 62

The same procedures and conditions as described in Example 61 were employed, except that 5.3 hours of reaction time was applied. The resultant polymer was dissolved in methyl ethyl ketone, some insoluble gel was observed. The hydrogenation degree of the soluble part was determined by infra-red analysis. A 67.9% degree of hydrogenation of the soluble part was achieved.

Example 63

The same procedures and conditions as described in Example 62 were employed, except that 130° C. of reaction temperature, 1000 psi (6.90 MPa) of hydrogen pressure and 5.0 hours of reaction time were applied. The resultant polymer was dissolved in methyl ethyl ketone, some insoluble gel was observed. The hydrogenation degree of the soluble part was determined by infra-red analysis. A 61.1% degree of hydrogenation of the soluble part was achieved.

Example 64

The same procedures and conditions as described in Example 63 were employed, except that 0.0025 gram of catalyst was applied. The resultant polymer was dissolved in methyl ethyl ketone, some insoluble gel was observed. The hydrogenation degree of the soluble part was determined by infra-red analysis. A 40.2% degree of hydrogenation of the soluble part was achieved.

A summary of Examples 1 through 64 is also given in Table 2.

TABLE 2

Summary of the examples

| Example | Sample | Polymer | Ir/Polymer [ppm] | catalyst/ Polymer [% b.w.] | $P_{H2}$ [psi/MPa] | T [° C.] | t [h] | HD [%] |
|---|---|---|---|---|---|---|---|---|
| 1 | A | NBR | 1194 | 0.5 | 1200/8.28 | 80 | 1.0 | 74.3 |
| 2 | | NBR | 1194 | 0.5 | 1200/8.28 | 80 | 3.0 | 97.3 |
| 3 | | NBR | 1194 | 0.5 | 1200/8.28 | 80 | 6.0 | 99.4 |
| 4 | | NBR | 1194 | 0.5 | 1200/8.28 | 90 | 1.0 | 87.1 |

TABLE 2-continued

Summary of the examples

| Example | Sample | Polymer | Ir/Polymer [ppm] | catalyst/ Polymer [% b.w.] | $P_{H2}$ [psi/MPa] | T [° C.] | t [h] | HD [%] |
|---|---|---|---|---|---|---|---|---|
| 5 |  | NBR | 1194 | 0.5 | 1200/8.28 | 90 | 3.0 | 99.3 |
| 6 |  | NBR | 1194 | 0.5 | 1200/8.28 | 90 | 6.0 | 99.9 |
| 7 | B | NBR | 597 | 0.25 | 400/2.76 | 100 | 1.0 | 23.4 |
| 8 |  | NBR | 597 | 0.25 | 400/2.76 | 100 | 3.0 | 53.0 |
| 9 |  | NBR | 597 | 0.25 | 400/2.76 | 100 | 6.0 | 80.0 |
| 10 |  | NBR | 597 | 0.25 | 800/5.52 | 100 | 1.0 | 60.2 |
| 11 |  | NBR | 597 | 0.25 | 800/5.52 | 100 | 3.0 | 90.0 |
| 12 |  | NBR | 597 | 0.25 | 800/5.52 | 100 | 6.0 | 99.2 |
| 13 |  | NBR | 597 | 0.25 | 1200/8.28 | 100 | 1.0 | 77.4 |
| 14 |  | NBR | 597 | 0.25 | 1200/8.28 | 100 | 3.0 | 99.0 |
| 15 |  | NBR | 597 | 0.25 | 1200/8.28 | 100 | 6.0 | 99.8 |
| 16 |  | NBR | 597 | 0.25 | 1200/8.28 | 80 | 1.0 | 31.3 |
| 17 |  | NBR | 597 | 0.25 | 1200/8.28 | 80 | 3.0 | 60.9 |
| 18 |  | NBR | 597 | 0.25 | 1200/8.28 | 80 | 6.0 | 86.6 |
| 19 |  | NBR | 597 | 0.25 | 1200/8.28 | 90 | 1.0 | 47.0 |
| 20 |  | NBR | 597 | 0.25 | 1200/8.28 | 90 | 3.0 | 75.0 |
| 21 |  | NBR | 597 | 0.25 | 1200/8.28 | 90 | 6.0 | 93.5 |
| 22 | C | NBR | 299 | 0.125 | 1200/8.28 | 90 | 1.0 | 23.1 |
| 23 |  | NBR | 299 | 0.125 | 1200/8.28 | 90 | 3.0 | 56.7 |
| 24 |  | NBR | 299 | 0.125 | 1200/8.28 | 90 | 6.0 | 81.5 |
| 25 |  | NBR | 299 | 0.125 | 400/2.76 | 100 | 3.0 | 29.2 |
| 26 |  | NBR | 299 | 0.125 | 400/2.76 | 100 | 6.0 | 53.1 |
| 27 |  | NBR | 299 | 0.125 | 800/5.52 | 100 | 1.0 | 34.1 |
| 28 |  | NBR | 299 | 0.125 | 800/5.52 | 100 | 3.0 | 64.8 |
| 29 |  | NBR | 299 | 0.125 | 800/5.52 | 100 | 6.0 | 87.7 |
| 30 |  | NBR | 299 | 0.125 | 1200/8.28 | 100 | 1.0 | 52.5 |
| 31 |  | NBR | 299 | 0.005 | 1200/8.28 | 100 | 3.0 | 85.2 |
| 32 |  | NBR | 299 | 0.125 | 1200/8.28 | 100 | 6.0 | 96.7 |
| 33 |  | NBR | 299 | 0.125 | 1200/8.28 | 120 | 1.0 | 66.3 |
| 34 |  | NBR | 299 | 0.125 | 1200/8.28 | 120 | 3.0 | 92.0 |
| 35 |  | NBR | 299 | 0.125 | 1200/8.28 | 120 | 6.0 | 98.2 |
| 36 |  | NBR | 299 | 0.125 | 1200/8.28 | 130 | 1.0 | 73.5 |
| 37 |  | NBR | 299 | 0.125 | 1200/8.28 | 130 | 3.0 | 95.5 |
| 38 |  | NBR | 299 | 0.125 | 1200/8.28 | 140 | 1.0 | 79.5 |
| 39 |  | NBR | 299 | 0.125 | 1200/8.28 | 140 | 3.0 | 95.8 |
| 40 |  | NBR | 299 | 0.125 | 1200/8.28 | 150 | 1.0 | 96.1 |
| 41 |  | NBR | 299 | 0.125 | 1200/8.28 | 150 | 3.0 | 98.9 |
| 42 |  | NBR | 299 | 0.125 | 1200/8.28 | 160 | 1.0 | 95.6 |
| 43 |  | NBR | 299 | 0.125 | 1200/8.28 | 160 | 3.0 | 98.4 |
| 44 |  | NBR | 299 | 0.125 | 1200/8.28 | 170 | 1.0 | 93.5 |
| 45 |  | NBR | 299 | 0.125 | 1200/8.28 | 170 | 3.0 | 98.9 |
| 46 | D | NBR | 143 | 0.060 | 1200/8.28 | 120 | 1.0 | 27.5 |
| 47 |  | NBR | 143 | 0.060 | 1200/8.28 | 120 | 3.0 | 39.4 |
| 48 |  | NBR | 143 | 0.060 | 1200/8.28 | 120 | 6.0 | 61.1 |
| 49 |  | NBR | 143 | 0.060 | 1200/8.28 | 140 | 1.0 | 33.3 |
| 50 |  | NBR | 143 | 0.060 | 1200/8.28 | 140 | 3.0 | 45.6 |
| 51 |  | NBR | 143 | 0.060 | 1200/8.28 | 140 | 6.0 | 63.5 |
| 52 |  | NBR | 143 | 0.060 | 1200/8.28 | 160 | 1.0 | 43.3 |
| 53 |  | NBR | 143 | 0.060 | 1200/8.28 | 160 | 3.0 | 58.6 |
| 54 |  | NBR | 143 | 0.060 | 1200/8.28 | 160 | 6.0 | 65.6 |
| 55 | E | SBS | 299 | 0.125 | 400/2.76 | 80 | 1.0 | 92.8 |
| 56 |  | SBS | 299 | 0.125 | 400/2.76 | 80 | 3.0 | 96.4 |
| 57 |  | SBS | 299 | 0.125 | 400/2.76 | 80 | 6.0 | 98.5 |
| 58 |  | SBS | 299 | 0.125 | 400/2.76 | 100 | 1.0 | 98.0 |
| 59 |  | SBS | 299 | 0.125 | 400/2.76 | 100 | 3.0 | 99.4 |
| 60 |  | SBS | 299 | 0.125 | 100/0.69 | 60 | 1.0 | 54.9 |
| 61 | Catalyst | NBR | 1990 | 0.83 | 500/3.45 | 145 | 3.0 | 52.4 |
| 62 | solids | NBR | 1990 | 0.83 | 500/3.45 | 145 | 5.3 | 67.9 |
| 63 | physically | NBR | 1990 | 0.83 | 1000/6.90 | 130 | 5.0 | 61.1 |
| 64 | mixed with polymer articles | NBR | 995 | 0.42% | 1000/6.90 | 130 | 5.0 | 40.2 |

1 Ir/polymer: ppm of iridium metal with respect to polymer.
2 RT means 24 +/− 2° C.
3 HD: hydrogenation degree.

What is claimed is:

1. A process for selectively hydrogenating carbon-carbon double bonds in a diene-based polymer which comprises repeating units of at least one conjugated diene as monomer (a) and at least one further copolymerizable monomer (b) comprising subjecting the diene-based polymer which comprises repeating units of at last one conjugated diene as monomer (a) and at least one further copolymerizable monomer (b) and which is present in bulk form to a hydrogenation in the absence of any organic solvent and in the presence of 0.001% by weight - 0.95% by weight of an iridium containing catalyst, based on the polymer to be hydrogenated, wherein an iridium complex having the general formula (I) is used as catalyst,

[Ir(COD)LL']Pf$_6$   (I)

wherein
COD means 1,5 cyclooctadiene,
L means PR$_3$ with R being alkyl, cycloalkyl, or aryl,
L' means PR$_3$, or pyridine, with R being alkyl, cycloalkyl, or aryl.

2. The process according to claim 1,
wherein an iridium complex having the general formula (1) is used as catalyst,

[Ir(COD)LL']Pf$_6$   (I)

wherein
COD means 1,5-cyclooctadiene,
L means PR$_3$ with R being alkyl, cycloalkyl, or aryl,
L' means PR$_3$ or pyridine, with R being alkyl, cycloalkyl, or aryl;
wherein L and L' are identical or different and mean PMePh$_3$ (Me=methyl, Ph=phenyl), PPH$_3$, PCy$_3$ (Cy=cyclohexyl), P(i-P)$_3$ (i-Pr=iso-propyl, or dpe (bis (diphenylphosphino)ethane) and L' may also represent pyridine.

3. The process according to claim 1, wherein 0.01% b.w. -0,8% b.w. of the iridium-containing catalyst are used based on the polymer to be hydrogenated.

4. The process according to claim 1, wherein the carbon-carbon double bonds containing polymer subjected to the hydrogenation comprises repeating units of at least one conjugated diene as monomer (a) and at least one further copolymerizable monomer (b).

5. The process according to claim 1, wherein as monomers (b) olefins or vinylaromatic monomers are used.

6. The process according to claim 1, wherein as monomers (b) ethylene, propylene, styrene, alpha-methyl styrene, o-chlorostyrene, vinyltoluenes, or vinylesters of aliphatic or branched C$_1$-C$_{18}$ monocarboxylic acids are used.

7. The process according to claim 1, wherein as monomers (b) vinyl acetate, vinyl propionate, vinyl butyrate, vinyl valerate, vinyl hexanoate, vinyl 2-ethylhexanoate, vinyl decanoate, vinyl laurate or vinyl stearate are used.

8. The process according to claim 1, wherein a copolymer of 1,3-butadiene and styrene or alpha-methylstyrene is subjected to hydrogenation.

9. The process according to claim 1, wherein as monomers (b) esters of ethylenically unsaturated mono- or dicarboxylic acids with C$_1$-C$_{12}$ alkanols or C$_5$-C$_{10}$ cycloalkanols are used.

10. The process according to claim 1, wherein as monomers (b) esters of acrylic acid, methacrylic acid, maleic acid, fumaric acid and itaconic acid with methanol, ethanol, n-propanol, isopropanol, 1- butanol, 2-butanol, isobutanol, tert.-butanol, n-hexanol, 2-ethylhexanol, cyclopentanol or cyclohexanol are used.

11. The process according to claim 1, wherein as monomers (b) methyl methacrylate, n-butyl methacrylate, tert-butyl methacrylate, n-butyl acrylate, tert-butyl acrylate, and 2-ethylhexyl acrylate are used.

12. The process according to claim 1, wherein as monomers (b) α, β-unsaturated nitriles are used.

13. The process according to claim 1, wherein as monomers (b) acrylonitrile, methacrylonitrile, ethacrylonitrile or mixtures thereof are used.

14. The process according to claim 1, wherein a nitrile rubber ("NBR"), this being a copolymer of an α,β-unsaturated nitrile, a conjugated diene, and optionally at least one further copolymerizable monomer is subjected to hydrogenation.

15. The process according to claim 1, wherein a nitrile rubber ("NBR"), this being a copolymer of acrylonitrile, 1,3-butadiene and optionally at least one further copolymerizable monomer selected from the group consisting of an α,β-unsaturated monocarboxylic acid, an α,β-unsaturated dicarboxylic acid, an ester and amide thereof is subjected to hydrogenation.

16. The process according to claim 1, wherein a terpolymer of acrylonitrile, 1,3-butadiene and a third monomer selected from the group consisting of fumaric acid, maleic acid, acrylic acid, methacrylic acid, n-butyl acrylate, and tert-butyl acrylate is subjected to hydrogenation.

17. The process according to claim 1, wherein the hydrogenation is carried out at a temperature in the range of from 0° C. to 100° C. and at a hydrogen pressure of from 0,1 to 20 MPa.

18. The process according to claim 1, wherein iridium-containing catalyst is introduced into the diene-based polymer by contacting the catalyst or a catalyst solution with a solution of the diene-based polymer and then removing the solvent, or by direct mechanical mixing the iridium-containing catalyst solids with the diene-based polymer, or by impregnating the diene-based polymer with the catalyst.

* * * * *